United States Patent [19]
Hashimoto et al.

[11] Patent Number: 5,744,409
[45] Date of Patent: Apr. 28, 1998

[54] OPTICAL GLASS

[75] Inventors: Kazuaki Hashimoto; Koichi Sato, both of Tokyo, Japan

[73] Assignee: Hoya Corporation, Japan

[21] Appl. No.: 778,675

[22] Filed: Jan. 3, 1997

[51] Int. Cl.$^6$ .......................... C03C 3/078; C03C 3/089; C03C 3/064; C03C 4/20
[52] U.S. Cl. ................. 501/65; 501/64; 501/66; 501/69; 501/77; 501/78; 501/903
[58] Field of Search ................ 501/903, 64, 65, 501/66, 69, 77, 78, 67

[56] References Cited

U.S. PATENT DOCUMENTS

| | | | |
|---|---|---|---|
| 4,460,696 | 7/1984 | Harada et al. | 501/93 |
| 5,472,918 | 12/1995 | Onozawa | 501/77 |

*Primary Examiner*—Karl Group
*Attorney, Agent, or Firm*—Nixon & Vanderhye

[57] ABSTRACT

An optical glass containing, as glass components,

30~55 wt % of $SiO_2$,

5~30 wt % of $B_2O_3$, the total amount of $SiO_2$ and $B_2O_3$ being 56~70 wt % and the $SiO_2/B_2O_3$ weight ratio being 1.3~12.0, 7~12 wt % of $Li_2O$, in which 7 wt % is excluded, 0~5 wt % of $Na_2O$, 0~5 wt % of $K_2O$, the total amount of $Li_2O$, $Na_2O$ and $K_2O$ being 7 to 12 wt % in which 7 wt % is excluded, 10~30 wt % of BaO, 0~10 wt % of MgO, 0~20 wt % of CaO, 0~20 wt % of SrO, and 0~20 wt % of ZnO the total amount of BaO, MgO, CaO, SrO and ZnO being 10~30 wt %, and the total amount of $SiO_2$, $B_2O_3$, $Li_2O$ and BaO being at least 72 wt %.

5 Claims, No Drawings

OPTICAL GLASS

FIELD OF THE INVENTION

The present invention relates to optical glass which has a low softening temperature, excellent chemical durability and suitability for use in precision press molding.

PRIOR ART OF THE INVENTION

In recent years, press molded lenses which obviate grinding or polishing after press molded are produced. For obtaining press molded lenses by the production of precision press molded optical glass, glass having a low softening temperature is advantageous in view of the prevention of the breakage of a pressing mold by oxidation, since the press molding temperature can be decreased. Glasses which satisfy the above optical characteristics have been so far disclosed, while all of these glasses have too high softening temperatures to be processed by precision press molding.

For example, JP-B-55-11626 discloses optical glass having optical constants such as a refractive index nd of about 1.62 and an Abbe's number vd of about 60. The above glass contains small amounts of $La_2O_3$, CaO, $Al_2O_3$, $P_2O_5$, etc., in addition to fundamental components consisting of $B_2O_3$, $SiO_2$ and BaO and therefore has excellent chemical durability over conventionally commercially available glass. Since, however, the above glass has too high a softening temperature to be used for producing a lens by press molding.

JP-A-4-37628 discloses barium crown glass containing 23~62 wt % of $SiO_2$, 0~28 wt % of $B_2O_3$, the total amount of $SiO_2+B_2O_3$ being 36~62 wt %, 0.5~7 wt % of $Li_2O$, 12~52 wt % of BaO and 0.5~11 wt % of $La_2O_3$ and having a low electrical resistance suitable for melting by electrical application. The above glass has a lower softening temperature than the glass disclosed in the above JP-B-55-11626. However, the smallest one of sag temperatures Ts of glass compositions described in Examples thereof is 565° C., and it is therefore difficult to press-mold them at a low temperature.

Meanwhile, it is made known, for example, by "Ceramics Basic Lecture 4, for beginners to produce glass" written by YAMANE Masayuki, page 52 (issued by Uchida Rokakuho in 1989) that with an increase in the content of an alkali metal oxide in a glass composition, the softening temperature of the glass decreases. However, the alkali metal oxide tends to decrease the chemical durability of glass (see the above book, pages 80 to 85 and pages 99 to 103), and the decreasing of the softening temperature of glass and the retaining of chemical durability of the glass are contradictory, or have a relationship in which if one is achieved, the other is failed. In the glass composition disclosed in the above JP-A-4-37628, the content of $Li_2O$ which is an alkali metal oxide is limited to 7 wt % or less for retaining the chemical durability of glass. Since, however, the content of $Li_2O$ is so low, the glass has a high softening temperature, and it is therefore difficult to produce a lens by press molding at a low temperature.

SUMMARY OF THE INVENTION

It is therefore an object of the present invention to provide an optical glass which has a softening temperature (sag temperature) suitable for producing optical articles such as an optical lens by press molding at a low temperature and which also has chemical durability.

DETAILED DESCRIPTION OF THE INVENTION

The present inventors have made diligent studies to achieve the above object, and found the following in a glass composition containing $SiO_2$ and $B_2O_3$ as main components, there can be obtained an optical glass having both a softening temperature suitable for press molding at a low temperature and excellent chemical durability by optimizing the contents of $SiO_2$ and $B_2O_3$ which constitute a glass network, the total amount thereof and the weight ratio between $SiO_2$ and $B_2O_3$ even if the glass composition contains a large amount of $Li_2O$ which is a component for decreasing the softening temperature but is a component which deteriorates the chemical durability.

The present invention has been made on the basis of the above finding, and the gist of the present invention is an optical glass containing, as glass components, 30~55 wt % of $SiO_2$, 5~30 wt % of $B_2O_3$, the total amount of $SiO_2$ and $B_2O_3$ being 56~70 wt % and the $SiO_2/B_2O_3$ weight ratio being 1.3~12.0, 7~12 wt % of $Li_2O$, in which 7 wt % is excluded, 0~5 wt % of $Na_2O$, 0~5 wt % of $K_2O$, the total amount of $Li_2O$, $Na_2O$ and $K_2O$ being 7 to 12 wt % in which 7 wt % is excluded, 10~30 wt % of BaO, 0~10 wt % of MgO, 0~20 wt % of CaO, 0~20 wt % of SrO, and 0~20 wt % of ZnO the total amount of BaO, MgO, CaO, SrO and ZnO being 10~30 wt %, and the total amount of $SiO_2$, $B_2O_3$, $Li_2O$ and BaO being at least 72 wt %.

The present invention will be explained in detail hereinafter.

The optical glass of the present invention has the following physical properties owing to the above strict definition of the glass composition.

(i) Having a sag temperature of not higher than 560° C., i.e., a low softening temperature, the optical glass of the present invention can be remarkably suitably used in precision press molding at a low temperature.

(ii) Having a Dimming Resistivity (water durability by the powdered method) Dw and a Staining Resistivity (acid durability by the powdered method) Da, measured on the basis of Japanese Optical Glass Industrial Society Standard (for details of measurements, see Examples to be described later), of 0.15 wt % or less and 0.85 wt % or less, respectively, the optical glass of the present invention is excellent in chemical durability.

(iii) Having a refractive index nd of 1.55~1.63 and an Abbe's number vd of at least 55, the optical glass of the present invention shows an intermediate refractive index and a low dispersion.

The reasons for limiting the contents of the components in the optical glass of the present invention will be explained below.

$SiO_2$ is a fundamental component for forming a glass network, and it is required to incorporate $SiO_2$ in an amount of at least 30 wt % for obtaining stable productivity and sufficient chemical durability. However, when the content thereof exceeds 55 wt %, the refractive index nd is extremely low. The content of $SiO_2$ is therefore limited to 30~55 wt %. The content thereof is particularly preferably 30~45 wt %.

$B_2O_3$ is also a fundamental component for forming a glass network, and has an effect on bringing optical constants into a low dispersion side and increasing the Abbe's number vd. It is required to incorporate $B_2O_3$ in an amount of at least 5 wt % for obtaining desired optical constants. When the content thereof exceeds 30 wt %, however, the chemical durability decreases. The content of $B_2O_3$ is therefore limited to 5~30 wt %. The content of $B_2O_3$ is particularly preferably 10~30 wt %.

Further, $SiO_2$ and $B_2O_3$ have an effect on decreasing the refractive index nd of the glass. The total amount of $SiO_2$+$B_2O_3$ is therefore required to be at least 56 wt % for obtaining desired optical constants. When the above total amount exceeds 70 wt %, the refractive index is extremely decreased. The total amount of $SiO_2$+$B_2O_3$ is therefore limited to 56~70 wt %. The total amount of $SiO_2$+$B_2O_3$ is particularly preferably 57~65 wt %.

The amount ratio between $SiO_2$ and $B_2O_3$ is also essential for obtaining glass excellent in chemical durability, and the $SiO_2/B_2O_3$ weight ratio is limited to 1.3–12.0. The reason therefor is as follows. When the $SiO_2/B_2O_3$ weight ratio is less than 1.3 so that the amount of $B_2O_3$ is large, the glass is greatly deteriorated in chemical durability so that it is difficult to decrease the softening temperature of the glass. When the $SiO_2/B_2O_3$ weight ratio exceeds 12.0 so that the amount of $SiO_2$ is large, the optical constants shift toward a high dispersion side so that the Abbe's number vd is extremely small, and it is difficult to obtain desired optical constants. Further, the glass is poor in melting property, and when the glass is melted, a large amount of $SiO_2$ remains non-melted on a melt surface. The $SiO_2/B_2O_3$ weight ratio is particularly preferably 1.3~5.0.

$Li_2O$ is the most effective component for decreasing the softening temperature of the glass. In the present invention, it is required to incorporate $Li_2O$ in an amount of more than 7 wt % for decreasing the softening temperature of the glass. Even when it is incorporated in an amount of over 7 wt %, surprisingly, the chemical durability of the glass is hardly deteriorated up to the predetermined content of $Li_2O$. However, when the content of $Li_2O$ exceeds 12 wt %, the chemical durability is materially deteriorated. The Content of $Li_2O$ is therefore limited to 7~12 wt % provided that 7 wt % is excluded. The content of $Li_2O$ is particularly preferably 7.5~11 wt %.

BaO is an essential component for obtaining the desired refractive index nd and the desired Abbe's number vd. The content thereof is required to be at least 10 wt %. However, when the content of BaO exceeds 30 wt %, the chemical durability decreases. The content of BaO is therefore limited to 10~30 wt %. The content of BaO is particularly preferably 15~28 wt %.

In the optical glass of the present invention, the total amount of the above essential components, $SiO_2$, $B_2O_3$, $Li_2O$ and BaO, is limited to at least 72 wt %. The reason therefor is as follows. The optical constants of the glass having an intermediate refractive index and a low dispersion, provided by the present invention, are derived from the above $SiO_2$, $B_2O_3$, $Li_2O$ and BaO, and at least 72 wt % of the glass is required to be formed of these components for maintaining the desired optical constants.

The optical glass of the present invention may contain the following glass components as required.

$Na_2O$ and $K_2O$ are used as components for replacing part of $Li_2O$. However, when the content of each exceeds 5 wt %, not only the chemical durability is deteriorated, but also the refractive index decreases. The content of each of $Na_2O$ and $K_2O$ is preferably 0~5 wt %. When $Na_2O$ and $K_2O$ is incorporated, the total amount of $Li_2O$+$Na_2O$+$K_2O$ is preferably 7~12 wt % provided that 7 wt % is excluded.

Further, for adjusting the optical constants, 0~10wt % of MgO and 0 to 20 wt % of each of CaO, SrO and ZnO may be added. When these optional components are incorporated together with BaO, the total amount of BaO+MgO+CaO+SrO+ZnO is preferably 10~30 wt %. The reason therefor is that when the above total amount exceeds 30 wt %, the chemical durability and the devitrification resistance decrease.

$Al_2O_3$ is a component for improving the glass in chemical durability, and it is preferred to incorporate $Al_2O_3$ in an amount of at least 1 wt %. When the content thereof exceeds 7.5 wt %, not only the devitrification resistance of the glass is deteriorated, but also the defoaming property decreases. The content of $Al_2O_3$ is therefore preferably 1~7.5 wt %, particularly preferably 5.1~7.5 wt %.

$P_2O_5$ is used as a component for replacing part of $B_2O_3$ and serves to improve the chemical durability. When the content thereof exceeds 3 wt %, the glass tends to undergo phase separation, and the content of $P_2O_5$ is therefore preferably 0~3 wt %. The content of $P_2O_5$ is particularly preferably 0~2 wt %.

$La_2O_3$ is an effective component which can improve the chemical durability with desired chemical constants being obtained. When the content thereof exceeds 15 wt %, however, the glass has too high a refractive index nd, and at the same, the devitrification resistance decreases. The content of $La_2O_3$ is therefore preferably 0~15 wt %, particularly preferably 1~15 wt %. Further, part of $La_2O_3$ may be replaced with $Y_2O_3$ or $Gd_2O_3$. When the content of each exceeds 5 wt %, the Abbe's number vd is too small, and the devitrification resistance is deteriorated. The content of each of these components is therefore preferably 0~5 wt %, particularly preferably 0~3 wt %. When $Y_2O_3$ and $Gd_2O_3$ are used in combination with $La_2O_3$, the total amount of $La_2O_3$+$Y_2O_3$+$Gd_2O_3$ is preferably 1~15 wt %.

For adjusting the optical constants and improving the durability, $TiO_2$, $Nb_2O_5$, $ZrO_2$, etc. as substitutes for $La_2O_3$ or BaO may be used in amounts of 0~3 wt %, 0~3 wt % and 0~5wt %, respectively. When the amount of each component exceeds the above corresponding upper limit, however, the Abbe's number is too small, the devitrification resistance decreases, and the coloring of the glass is intensified. The above components are preferably used in the above amount ranges. For improving the stability of the glass, PbO may be incorporated. When the content thereof exceeds 5 wt %, however, the Abbe's number is too small, the coloring of the glass is intensified, and the chemical durability decreases. The content of PbO is therefore preferably 0~5 wt %.

Further, as a defoamer, $As_2O_3$ and $Sb_2O_3$ may be incorporated. However, even if each of these components is further incorporated in an amount of over 1 wt % based on the amount of the glass composition excluding the defoamer, there is not obtained any further effect on the defoaming. The content of each component is therefore preferably 0~1 wt %.

The glass of the present invention may contain F, $WO_3$, $Ta_2O_5$, $GeO_2$ and $Yb_2O_3$ as required in addition to the above components so long as the glass characteristics are not deteriorated. When these components are incorporated, the contents thereof are preferably up to 5 wt %, up to 3 wt %, up to 3 wt %, up to 5 wt % and up to 5 wt %, respectively.

EXAMPLES

The present invention will be further explained with reference to Examples hereinafter.

Example 1

A glass batch was prepared from $SiO_2$, $H_3BO_3$, $Al(OH)_3$, $Li_2CO_3$, $CaCO_3$, $Ba(NO_3)_2$ and $La_2O_3$ as raw materials, melted in a platinum crucible at 1,400° C., and homogenized by stirring it. Then, the melt was defoamed by fining, cast into a mold and gradually cooled to prepare glass. A glass mass having a predetermined weight was cut from the prepared glass, heated up to 530° C. a little higher than the glass transformation temperature of 500° C., and held at this temperature for 3 hours. Then, the glass mass was cooled at a constant rate −30° C./hour to a temperature which was lower than the temperature used for the holding by 200° C., to remove a strain in the glass. The strain-removed glass was measured for a refractive index nd, an Abbe's number vd, a glass transformation temperature (°C.) and a sag temperature (°C.). Further, part of the prepared glass was crushed and then measured for a Dimming Resistivity (water durability by the powdered method) Dw and a Staining Resistivity (acid durability by the powdered method) Da.

The above water durability and the above acid durability were measured as follows. That is, each was measured on the basis of "methods of measuring optical glass for chemical durability (powdered method)" in Japanese Optical Glass Industrial Society Standard. The former was measured by immersing a glass powder having a mass equivalent to the specific gravity of the glass in a boiling water bath for 1 hour and determining a weight loss based on weight %. The latter was measured by immersing a glass powder in a 0.01 N nitric acid aqueous solution at 100° C. in the similar manner as in the measurement of the water durability and determining a weight loss based on weight %.

Table 1 shows the refractive index, Abbe's number, glass transformation temperature, refractive index, water durability and acid durability of the optical glass obtained in this Example.

Table 1 shows that the optical glass of Example 1 had a refractive index of 1.589 and an Abbe's number of 61 or had desired optical constants (intermediate refractive index and low dispersion), that it had a sag temperature of 540° C. or had a low softening temperature, and that it had a water durability Dw of 0.10 wt % and an acid durability Da of 0.81 wt % or had excellent chemical durability.

Further, part of the prepared glass was cold-ground to obtain a spherical preform, and then precision press molded to prepare an aspheric convex lens, and it was found that the prepared glass was suitable for use in precision pressing.

Examples 2-21

Glass was prepared in the same manner as in Example 1 except that the glass composition was replaced with that shown in Tables 1 to 7. The glass was measured for a refractive index, an Abbe's number, a glass transformation temperature, a sag temperature, a water durability and an acid durability in the same manner as in Example 1. As the measurement results are shown in Tables 1 to 7, the glasses obtained in Examples 2 to 21 had a refractive index of 1.575~1.622 and an Abbe's number of 55~61 or had desired optical constants (intermediate refractive index and low dispersion), they had a sag temperature of 505°~560° C. or had low softening points, and they had a water durability Dw of 0.04~0.15 wt % and an acid durability Da of 0.31~0.81 or had excellent chemical durability.

Further, part of each of the prepared glasses was cold-ground to obtain spherical preforms, and then precision press molded to prepare aspheric convex lenses, and it was found that the prepared glasses were suitable for precision pressing.

Comparative Examples 1-3

In Comparative Example 1, conventional heavy crown glass was prepared and evaluated for physical properties in the same manner as in Example 1. In Comparative Examples 2 and 3, glasses described in Examples 1 and 2 of JP-A-4-37628 were prepared and evaluated for physical properties in the same manner as in Example 1.

Table 8 shows the results of the above evaluation of the physical properties. The heavy crown glass in Comparative Example 1 had a refractive index of 1.589, an Abbe's number of 61 and a sag temperature of 690° C., or the sag temperature thereof was higher than the sag temperature of the glass having the same refractive index and the same Abbe's number, obtained in Example 10, by as much as 160° C., and it was found that the heavy crown glass was not at all suitable for press molding. The glass in Comparative Example 2 had a refractive index of 1.589, an Abbe's number of 61 and a sag temperature of 595° C., and it was found that the sag temperature thereof was higher than that of the glass having the same refractive index and the same Abbe's number, obtained in Example 10, by 65° C. Further, the glass in Comparative Example 3 had a refractive index of 1.618, an Abbe's number of 55 and a sag temperature of 605° C., and it was found that the sag temperature thereof was higher than that of the glass having the same refractive index and the same Abbe's number, obtained in Example 14, by 80° C.

TABLE 1

|  |  | Example | | |
|---|---|---|---|---|
|  |  | 1 | 2 | 3 |
| Glass Composition wt % | $SiO_2$ | 37.8 | 47.2 | 39.2 |
|  | $B_2O_3$ | 24.0 | 11.5 | 22.7 |
|  | (A) *1 | 61.8 | 58.7 | 61.9 |
|  | $SiO_2/B_2O_3$ | 1.6 | 4.1 | 1.7 |
|  | $P_2O_5$ | — | — | — |
|  | $Al_2O_3$ | 5.3 | 3.2 | 6.4 |
|  | $Li_2O$ | 8.5 | 7.3 | 7.2 |
|  | $Na_2O$ | — | — | — |
|  | $K_2O$ | — | 1.8 | — |
|  | (B) *2 | 8.5 | 9.1 | 7.2 |
|  | MgO | — | — | — |
|  | CaO | 5.0 | — | 7.5 |
|  | SrO | — | — | — |
|  | BaO | 16.1 | 21.8 | 13.7 |
|  | ZnO | — | 5.0 | — |
|  | (C) *3 | 21.1 | 26.8 | 21.2 |
|  | $La_2O_3$ | 3.3 | 2.2 | 3.3 |
|  | $Y_2O_3$ | — | — | — |
|  | $Gd_2O_3$ | — | — | — |
|  | (D) *4 | 3.3 | 2.2 | 3.3 |
|  | $TiO_2$ | — | — | — |
|  | $ZrO_2$ | — | — | — |
|  | $Nb_2O_5$ | — | — | — |
|  | $As_2O_3$ | 0.5 | 0.5 | 0.5 |
|  | $Sb_2O_3$ | 0.2 | — | 0.2 |
|  | Total | 100.7 | 100.5 | 100.7 |
| Property values | Refractive index nd | 1.589 | 1.580 | 1.590 |
|  | Abbe's number vd | 61 | 59 | 61 |
|  | Transformation temperature °C. | 500 | 495 | 525 |
|  | Sag temperature °C. | 540 | 535 | 550 |
|  | Water durability Dw *5 | 0.10 | 0.04 | 0.12 |
|  | Acid durability Da *5 | 0.81 | 0.35 | 0.74 |

*1 (A) = $SiO_2 + B_2O_3$
*2 (B) = $Li_2O + Na_2O + K_2O$
*3 (C) = $MgO + CaO + SrO + BaO + ZnO$
*4 (D) = $La_2O_3 + Y_2O_3 + Gd_2O_3$
*5 Ratio of loss (wt %)

TABLE 2

| | | Example | | |
|---|---|---|---|---|
| | | 4 | 5 | 6 |
| Glass Composition wt % | SiO$_2$ | 54.8 | 41.9 | 39.3 |
| | B$_2$O$_3$ | 5.0 | 19.5 | 19.5 |
| | (A) *1 | 59.8 | 60.7 | 58.8 |
| | SiO$_2$/B$_2$O$_3$ | 11.0 | 2.1 | 2.0 |
| | P$_2$O$_5$ | – | – | – |
| | Al$_2$O$_3$ | 5.2 | 5.2 | 5.2 |
| | Li$_2$O | 10.0 | 9.0 | 8.5 |
| | Na$_2$O | – | – | – |
| | K$_2$O | – | – | – |
| | (B) *2 | 10.0 | 9.0 | 8.5 |
| | MgO | – | – | – |
| | CaO | – | – | – |
| | SrO | – | – | – |
| | BaO | 20.0 | 16.1 | 10.0 |
| | ZnO | – | – | – |
| | (C) *3 | 20.0 | 16.1 | 10.0 |
| | La$_2$O$_3$ | 5.0 | 9.0 | 15.0 |
| | Y$_2$O$_3$ | – | – | – |
| | Gd$_2$O$_3$ | – | – | – |
| | (D) *4 | 5.0 | 9.0 | 15.0 |
| | TiO$_2$ | – | – | – |
| | ZrO$_2$ | – | – | – |
| | Nb$_2$O$_5$ | – | – | – |
| | As$_2$O$_3$ | – | 0.5 | 0.5 |
| | Sb$_2$O$_3$ | – | 0.2 | 0.2 |
| | Total | 100.0 | 100.7 | 100.7 |
| Property values | Refractive index nd | 1.575 | 1.598 | 1.596 |
| | Abbe's number vd | 58 | 60 | 59 |
| | Transformation temperature °C. | 485 | 515 | 515 |
| | Sag temperature °C. | 535 | 550 | 550 |
| | Water durability Dw *5 | 0.03 | 0.10 | 0.07 |
| | Acid durability Da *5 | 0.31 | 0.49 | 0.36 |

*1 (A) = SiO$_2$ + B$_2$O$_3$
*2 (B) = Li$_2$O + Na$_2$O + K$_2$O
*3 (C) = MgO + CaO + SrO + BaO + ZnO
*4 (D) = La$_2$O$_3$ + Y$_2$O$_3$ + Gd$_2$O$_3$
*5 Ratio of loss (wt %)

TABLE 3

| | | Example | | |
|---|---|---|---|---|
| | | 7 | 8 | 9 |
| Glass Composition wt % | SiO$_2$ | 47.5 | 50.7 | 38.3 |
| | B$_2$O$_3$ | 19.5 | 13.4 | 23.6 |
| | (A) *1 | 66.9 | 64.1 | 61.9 |
| | SiO$_2$/B$_2$O$_3$ | 2.4 | 3.8 | 1.6 |
| | P$_2$O$_5$ | – | – | – |
| | Al$_2$O$_3$ | – | 3.6 | 5.5 |
| | Li$_2$O | 8.0 | 7.4 | 8.1 |
| | Na$_2$O | – | 1.0 | – |
| | K$_2$O | – | 3.4 | – |
| | (B) *2 | 8.0 | 11.8 | 8.1 |
| | MgO | – | – | – |
| | CaO | 2.3 | – | 5.8 |
| | SrO | – | – | – |
| | BaO | 10.8 | 16.5 | 14.1 |
| | ZnO | – | 2.0 | – |
| | (C) *3 | 13.1 | 18.5 | 19.9 |
| | PbO | – | – | – |
| | La$_2$O$_3$ | 12.0 | 2.0 | 4.6 |
| | Y$_2$O$_3$ | – | – | – |
| | Gd$_2$O$_3$ | – | – | – |
| | (D) *4 | 12.0 | 2.0 | 4.6 |
| | TiO$_2$ | – | – | – |
| | ZrO$_2$ | – | – | – |
| | Nb$_2$O$_5$ | – | – | – |
| | As$_2$O$_3$ | 0.5 | – | 0.1 |
| | Sb$_2$O$_3$ | 0.2 | 0.2 | – |
| | Total | 100.3 | 100.2 | 100.1 |
| Property values | Refractive index nd | 1.588 | 1.578 | 1.589 |
| | Abbe's number vd | 60 | 59 | 61 |
| | Transformation temperature °C. | 525 | 480 | 505 |
| | Sag temperature °C. | 560 | 525 | 545 |
| | Water durability Dw *5 | 0.15 | 0.12 | 0.05 |
| | Acid durability Da *5 | 0.66 | 0.50 | 0.63 |

*1 (A) = SiO$_2$ + B$_2$O$_3$
*2 (B) = Li$_2$O + Na$_2$O + K$_2$O
*3 (C) = MgO + CaO + SrO + BaO + ZnO
*4 (D) = La$_2$O$_3$ + Y$_2$O$_3$ + Gd$_2$O$_3$
*5 Ratio of loss (wt %)

TABLE 4

| | | Example | | |
|---|---|---|---|---|
| | | 10 | 11 | 12 |
| Glass Composition wt % | SiO$_2$ | 37.2 | 42.1 | 32.3 |
| | B$_2$O$_3$ | 22.0 | 15.0 | 23.1 |
| | (A) *1 | 59.2 | 57.1 | 55.4 |
| | SiO$_2$/B$_2$O$_3$ | 1.7 | 3.0 | 1.4 |
| | P$_2$O$_5$ | – | – | – |
| | Al$_2$O$_3$ | 5.8 | 5.2 | 4.6 |
| | Li$_2$O | 8.6 | 7.2 | 11.5 |
| | Na$_2$O | – | – | – |
| | K$_2$O | – | – | – |
| | (B) *2 | 8.6 | 7.2 | 11.5 |
| | MgO | – | – | – |
| | CaO | – | 4.4 | – |
| | SrO | – | 6.7 | – |
| | BaO | 22.4 | 10.0 | 10.0 |
| | ZnO | – | – | 12.9 |
| | (C) *3 | 22.4 | 21.1 | 22.9 |
| | PbO | – | 3.5 | – |
| | La$_2$O$_3$ | 4.0 | 5.9 | 5.6 |
| | Y$_2$O$_3$ | – | – | – |
| | Gd$_2$O$_3$ | – | – | – |
| | (D) *4 | 4.0 | 5.9 | 5.6 |
| | TiO$_2$ | – | – | – |
| | ZrO$_2$ | – | – | – |
| | Nb$_2$O$_5$ | – | – | – |
| | As$_2$O$_3$ | 0.1 | – | – |
| | Sb$_2$O$_3$ | – | 0.4 | – |
| | Total | 100.1 | 100.4 | 100.0 |
| Property values | Refractive index nd | 1.589 | 1.622 | 1.600 |
| | Abbe's number vd | 61 | 55 | 57 |
| | Transformation temperature °C. | 500 | 505 | 475 |
| | Sag temperature °C. | 530 | 545 | 505 |
| | Water durability Dw *5 | 0.08 | 0.13 | 0.13 |
| | Acid durability Da *5 | 0.68 | 0.65 | 0.70 |

*1 (A) = SiO$_2$ + B$_2$O$_3$
*2 (B) = Li$_2$O + Na$_2$O + K$_2$O
*3 (C) = MgO + CaO + SrO + BaO + ZnO
*4 (D) = La$_2$O$_3$ + Y$_2$O$_3$ + Gd$_2$O$_3$
*5 Ratio of loss (wt %)

TABLE 5

| | | Example | | |
|---|---|---|---|---|
| | | 13 | 14 | 15 |
| Glass Composition wt % | SiO$_2$ | 37.8 | 34.8 | 34.8 |
| | B$_2$O$_3$ | 22.0 | 25.0 | 25.0 |
| | (A) *1 | 59.8 | 59.8 | 59.8 |
| | SiO$_2$/B$_2$O$_3$ | 1.7 | 1.4 | 1.4 |
| | P$_2$O$_5$ | — | — | — |
| | Al$_2$O$_3$ | 7.3 | 5.2 | 5.2 |
| | Li$_2$O | 8.5 | 10.0 | 10.0 |
| | Na$_2$O | — | — | — |
| | K$_2$O | — | — | — |
| | (B) *2 | 8.5 | 10.0 | 10.0 |
| | MgO | — | — | — |
| | CaO | 5.0 | — | — |
| | SrO | 6.1 | — | — |
| | BaO | 10.0 | 10.0 | 10.0 |
| | ZnO | — | 6.7 | 6.6 |
| | (C) *3 | 21.1 | 16.7 | 16.6 |
| | La$_2$O$_3$ | 3.3 | 5.0 | 5.0 |
| | Y$_2$O$_3$ | — | — | — |
| | Gd$_2$O$_3$ | — | — | 1.7 |
| | (D) *4 | 3.3 | 5.0 | 6.7 |
| | TiO$_2$ | — | 1.7 | — |
| | ZrO$_2$ | — | — | 1.7 |
| | Nb$_2$O$_5$ | — | 1.6 | — |
| | As$_2$O$_3$ | — | — | — |
| | Sb$_2$O$_3$ | 0.3 | — | — |
| | Total | 100.3 | 100.0 | 100.0 |
| Property values | Refractive index nd | 1.589 | 1.601 | 1.593 |
| | Abbe's number vd | 60 | 55 | 59 |
| | Transformation temperature °C. | 505 | 495 | 490 |
| | Sag temperature °C. | 545 | 525 | 525 |
| | Water durability Dw *5 | 0.07 | 0.10 | 0.10 |
| | Acid durability Da *5 | 0.55 | 0.63 | 0.68 |

*1 (A) = SiO$_2$ + B$_2$O$_3$
*2 (B) = Li$_2$O + Na$_2$O + K$_2$O
*3 (C) = MgO + CaO + SrO + BaO + ZnO
*4 (D) = La$_2$O$_3$ + Y$_2$O$_3$ + Gd$_2$O$_3$
*5 Ratio of loss (wt %)

TABLE 6

| | | Example | | |
|---|---|---|---|---|
| | | 16 | 17 | 18 |
| Glass Composition wt % | SiO$_2$ | 34.8 | 38.0 | 35.7 |
| | B$_2$O$_3$ | 25.0 | 19.5 | 21.7 |
| | (A) *1 | 59.8 | 59.8 | 57.4 |
| | SiO$_2$/B$_2$O$_3$ | 1.4 | 1.9 | 1.6 |
| | P$_2$O$_5$ | — | — | 2.0 |
| | Al$_2$O$_3$ | 5.2 | 6.7 | 5.2 |
| | Li$_2$O | 7.5 | 8.0 | 8.7 |
| | Na$_2$O | 1.5 | — | — |
| | K$_2$O | 1.0 | — | — |
| | (B) *2 | 10.0 | 8.0 | 8.7 |
| | MgO | — | — | — |
| | CaO | — | — | — |
| | SrO | — | — | — |
| | BaO | 10.0 | 27.8 | 24.2 |
| | ZnO | 10.0 | — | — |
| | (C) *3 | 20.0 | 27.8 | 24.2 |
| | La$_2$O$_3$ | 5.0 | — | 2.5 |
| | Y$_2$O$_3$ | — | — | — |
| | Gd$_2$O$_3$ | — | — | — |
| | (D) *4 | 5.0 | 0 | 2.5 |
| | TiO$_2$ | — | — | — |
| | ZrO$_2$ | — | — | — |
| | Nb$_2$O$_5$ | — | — | — |
| | As$_2$O$_3$ | — | 0.1 | 0.1 |
| | Sb$_2$O$_3$ | — | — | — |
| | Total | 100.0 | 100.1 | 100.1 |
| Property values | Refractive index nd | 1.585 | 1.585 | 1.585 |
| | Abbe's number vd | 60 | 61 | 61 |
| | Transformation temperature °C. | 485 | 505 | 500 |
| | Sag temperature °C. | 520 | 545 | 535 |
| | Water durability Dw *5 | 0.11 | 0.12 | 0.10 |
| | Acid durability Da *5 | 0.81 | 0.77 | 0.66 |

*1 (A) = SiO$_2$ + B$_2$O$_3$
*2 (B) = Li$_2$O + Na$_2$O + K$_2$O
*3 (C) = MgO + CaO + SrO + BaO + ZnO
*4 (D) = La$_2$O$_3$ + Y$_2$O$_3$ + Gd$_2$O$_3$
*5 Ratio of loss (wt %)

TABLE 7

| | | Example | | |
|---|---|---|---|---|
| | | 19 | 20 | 21 |
| Glass Composition wt % | SiO$_2$ | 34.8 | 37.7 | 37.7 |
| | B$_2$O$_3$ | 25.0 | 22.3 | 22.0 |
| | (A) *1 | 59.8 | 60.0 | 59.7 |
| | SiO$_2$/B$_2$O$_3$ | 1.4 | 1.7 | 1.7 |
| | P$_2$O$_5$ | — | — | — |
| | Al$_2$O$_3$ | 5.2 | 5.2 | 5.2 |
| | Li$_2$O | 7.5 | 8.5 | 8.5 |
| | Na$_2$O | 2.5 | — | — |
| | K$_2$O | — | — | — |
| | (B) *2 | 10.0 | 8.5 | 8.5 |
| | MgO | — | — | 6.4 |
| | CaO | — | 5.0 | 1.0 |
| | SrO | — | — | — |
| | BaO | 10.0 | 15.9 | 15.9 |
| | ZnO | 10.0 | — | — |
| | (C) *3 | 20.0 | 20.9 | 23.3 |
| | La$_2$O$_3$ | 3.3 | 1.1 | 3.3 |
| | Y$_2$O$_3$ | 1.7 | — | — |
| | Gd$_2$O$_3$ | — | 1.3 | — |
| | (D) *4 | 5.0 | 2.4 | 3.3 |
| | Yb$_2$O$_3$ | — | 1.3 | — |
| | GeO$_2$ | — | 1.7 | — |
| | As$_2$O$_3$ | — | 0.2 | 0.2 |
| | Sb$_2$O$_3$ | — | 0.2 | 0.5 |
| | Total | 100.0 | 100.4 | 100.7 |
| Property values | Refractive index nd | 1.583 | 1.588 | 1.586 |
| | Abbe's number vd | 59 | 60 | 60 |
| | Transformation temperature °C. | 490 | 505 | 505 |
| | Sag temperature °C. | 525 | 539 | 543 |
| | Water durability Dw *5 | 0.11 | 0.10 | 0.15 |
| | Acid durability Da *5 | 0.80 | 0.80 | 0.60 |

*1 (A) = SiO$_2$ + B$_2$O$_3$
*2 (B) = Li$_2$O + Na$_2$O + K$_2$O
*3 (C) = MgO + CaO + SrO + BaO + ZnO
*4 (D) = La$_2$O$_3$ + Y$_2$O$_3$ + Gd$_2$O$_3$
*5 Ratio of loss (wt %)

TABLE 8

| | | Comparative Example | | |
|---|---|---|---|---|
| | | 1 | 2 | 3 |
| Glass Composition wt % | $SiO_2$ | 38.6 | 40.5 | 36.7 |
| | $B_2O_3$ | 14.9 | 16.1 | 11.0 |
| | (A) *1 | 53.5 | 56.6 | 47.7 |
| | $SiO_2/B_2O_3$ | 2.6 | 2.5 | 3.3 |
| | $P_2O_5$ | — | — | — |
| | $Al_2O_3$ | 5.0 | 5.9 | 4.5 |
| | $Li_2O$ | — | 4.5 | 2.0 |
| | $Na_2O$ | — | — | — |
| | $K_2O$ | — | — | — |
| | (B) *2 | 0 | 4.5 | 2.0 |
| | MgO | — | — | 3.0 |
| | CaO | — | 1.5 | 3.5 |
| | SrO | — | — | 6.0 |
| | BaO | 40.2 | 31.5 | 28.0 |
| | ZnO | — | — | 3.8 |
| | (C) *3 | 40.2 | 33.0 | 44.3 |
| | $La_2O_3$ | — | — | — |
| | $Y_2O_3$ | — | — | — |
| | $Gd_2O_3$ | — | — | — |
| | (D) *4 | 0 | 0 | 0 |
| | $TiO_2$ | — | — | 1.5 |
| | $ZrO_2$ | — | — | — |
| | $Nb_2O_5$ | — | — | — |
| | $As_2O_3$ | 1.0 | — | — |
| | $Sb_2O_3$ | 0.3 | — | — |
| | Total | 100.0 | 100.0 | 100.0 |
| Property values | Refractive index nd | 1.589 | 1.589 | 1.618 |
| | Abbe's number vd | 61 | 61 | 55 |
| | Transformation temperature °C. | — | — | — |
| | Sag temperature °C. | 690 | 595 | 605 |
| | Water durability Dw *5 | 0.12 | 0.09 | 0.03 |
| | Acid durability Da *5 | 0.68 | 0.66 | 0.58 |

*1 (A) = $SiO_2 + B_2O_3$
*2 (B) = $Li_2O + Na_2O + K_2O$
*3 (C) = $MgO + CaO + SrO + BaO + ZnO$
*4 (D) = $La_2O_3 + Y_2O_3 + Gd_2O_3$
*5 Ratio of loss (wt %)

As described above, the present invention provides optical glass having a softening point remarkably suitable for press molding and having excellent chemical durability. In particular, the optical glass of the present invention can be used as a precision press molding optical gass.

What is claimed is:

1. An optical glass containing, as glass components,
   30~55 wt % of $SiO_2$,
   5~30 wt % of $B_2O_3$,
   the total amount of $SiO_2$ and $B_2O_3$ being 56~70 wt % and the $SiO_2/B_2O_3$ weight ratio being 1.3~12.0,
   7~12 wt % of $Li_2O$, in which 7 wt % is excluded,
   0~5 wt % of $Na_2O$,
   0~5 wt % of $K_2O$,
   the total amount of $Li_2O$, $Na_2O$ and $K_2O$ being 7 to 12 wt % in which 7 wt % is excluded,
   10~30 wt % of BaO,
   0~10 wt % of MgO,
   0~20 wt % of CaO,
   0~20 wt % of SrO, and
   0~20 wt % of ZnO
   the total amount of BaO, MgO, CaO, SrO and ZnO being 10~30 wt %, and the total amount of $SiO_2$, $B_2O_3$, $Li_2O$ and BaO being at least 72 wt %.

2. The optical glass of claim 1, wherein the optical glass further contains
   1~7.5 wt % of $Al_2O_3$,
   0~3 wt % of $P_2O_5$,
   0~15 wt % of $La_2O_3$,
   0~5 wt % of $Y_2O_3$,
   0~5 wt % of $Gd_2O_3$,
   0~3 wt % of $TiO_2$,
   0~3 wt % of $Nb_2O_5$,
   0~5 wt % of $ZrO_2$, and
   0~5 wt % of PbO.

3. The optical glass of claim 2, wherein the optical glass contains
   5.1~7.5 wt % of $Al_2O_3$,
   1~15 wt % of $La_2O_3$,
   0~5 wt % of $Y_2O_3$, and
   0~5 wt % of $Gd_2O_3$,
   provided that the total amount of $La_2O_3$, $Y_2O_3$ and $Gd_2O_3$ is 1 to 15 wt %.

4. The optical glass according to claim 1, wherein the optical glass has a sag temperature of 560° C. or lower, a water durability Dw of 0.15 wt % or less, an acid durability Da of 0.85 wt % or less, a refractive index nd of 1.55 to 1.63 and an Abbe's number vd of at least 55.

5. The optical glass according to claim 1, wherein the optical glass is an optical glass used in precision press molding.

* * * * *